(12) United States Patent
Thakkar

(10) Patent No.: US 11,755,398 B2
(45) Date of Patent: Sep. 12, 2023

(54) TIME SERIES CLUSTERING TO TROUBLESHOOT DEVICE PROBLEMS BASED ON MISSED AND DELAYED DATA

(71) Applicant: Dell Products L.P., Round Rock, TX (US)

(72) Inventor: Bina Thakkar, Cary, NC (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/585,518

(22) Filed: Jan. 26, 2022

(65) Prior Publication Data
US 2023/0236915 A1    Jul. 27, 2023

(51) Int. Cl.
*G06F 11/00* (2006.01)
*G06F 11/07* (2006.01)
*G06F 16/28* (2019.01)

(52) U.S. Cl.
CPC ........ *G06F 11/076* (2013.01); *G06F 11/0709* (2013.01); *G06F 16/285* (2019.01)

(58) Field of Classification Search
CPC .... G06F 11/079; G06F 11/076; G06F 16/285; H04L 41/142; H04L 41/145; H04L 41/14; H04L 41/147; H04L 41/149; H04L 41/16; H04L 41/5009; H04L 41/5016; H04L 43/0829; H04L 43/0852; H04L 43/091; H04L 43/16
See application file for complete search history.

(56) References Cited

U.S. PATENT DOCUMENTS

| | | | |
|---|---|---|---|
| 2012/0084251 A1* | 4/2012 | Lingenfelder | G06F 17/18 707/600 |
| 2018/0096371 A1* | 4/2018 | Lederman | G06Q 30/0204 |
| 2019/0020563 A1* | 1/2019 | Meilik | H04L 43/16 |
| 2022/0286372 A1* | 9/2022 | Yamashita | H04L 43/0817 |
| 2022/0301282 A1* | 9/2022 | Witt | G06V 10/762 |

OTHER PUBLICATIONS

Haranas, Dell to Make 'All Offerings' As-A-Service, Says Michael Dell, https://www.crn.com/news/data-center/dell-to-make-all-offerings-as-a-service-says-michael-dell, 2020, 6 pgs.

* cited by examiner

*Primary Examiner* — Marc Duncan
(74) *Attorney, Agent, or Firm* — Amin, Turocy & Watson, LLP

(57) ABSTRACT

The described technology is generally directed towards processing time series (e.g., device telemetry) data, including identifying missing data (gaps in the time series data), and delayed data. The time series data are converted to ternary data, e.g., zero if timely, one if delayed or two if missing, and counts are obtained for each. If the missing data and/or delayed counts are significant, e.g., exceed a threshold percentage of the total data, the time series data indicates a problem that can be narrowed down to a more specific cause. For example, the time series data can be filtered by customer products/offers and customer locations, and if a filtered dataset's ternary data are similar to the problematic data, as determined via unsupervised clustering as similarity data (occurring at a similar time), the potential problem or problems can be narrowed to a potential cause based on that filtered dataset's similarity.

20 Claims, 12 Drawing Sheets

TIME SERIES CLUSTERING TO TROUBLESHOOT DEVICE PROBLEMS BASED ON MISSED AND DELAYED DATA

BACKGROUND

Network switches, servers and storage systems are often deployed in customer premises. The telemetry data from such devices are sent to an internal cloud hub of the equipment's provider. However, telemetry data is often missed or delayed, and it is challenging to troubleshoot such problems.

Consider for example that a large equipment provider can receive data from more than 100,000 devices that are sending data from more than 10,000 customers and from thousands of different locations for several products/service offers. There are several possible failure points, including internal and external gateways, the wide area network (WAN), and data processing whereby it is very difficult to detect any problem in a timely manner.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards processing time series (e.g., device telemetry) data to determine the source of an issue, such as for troubleshooting problems across products, locations and customers, and/or taking proactive action to mitigate a potential problem before a more significant problem occurs. Missing data, identified by gaps in the time series data, and delayed data are evaluated as described herein. If the missing data and/or delayed data are significant, e.g., the percentage of missing and/or delayed data reaches a threshold percentage, then unsupervised clustering is performed to identify similarity data among selected time series datasets occurring at a similar time. The similarity data is evaluated to determine the potential problem or problems.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
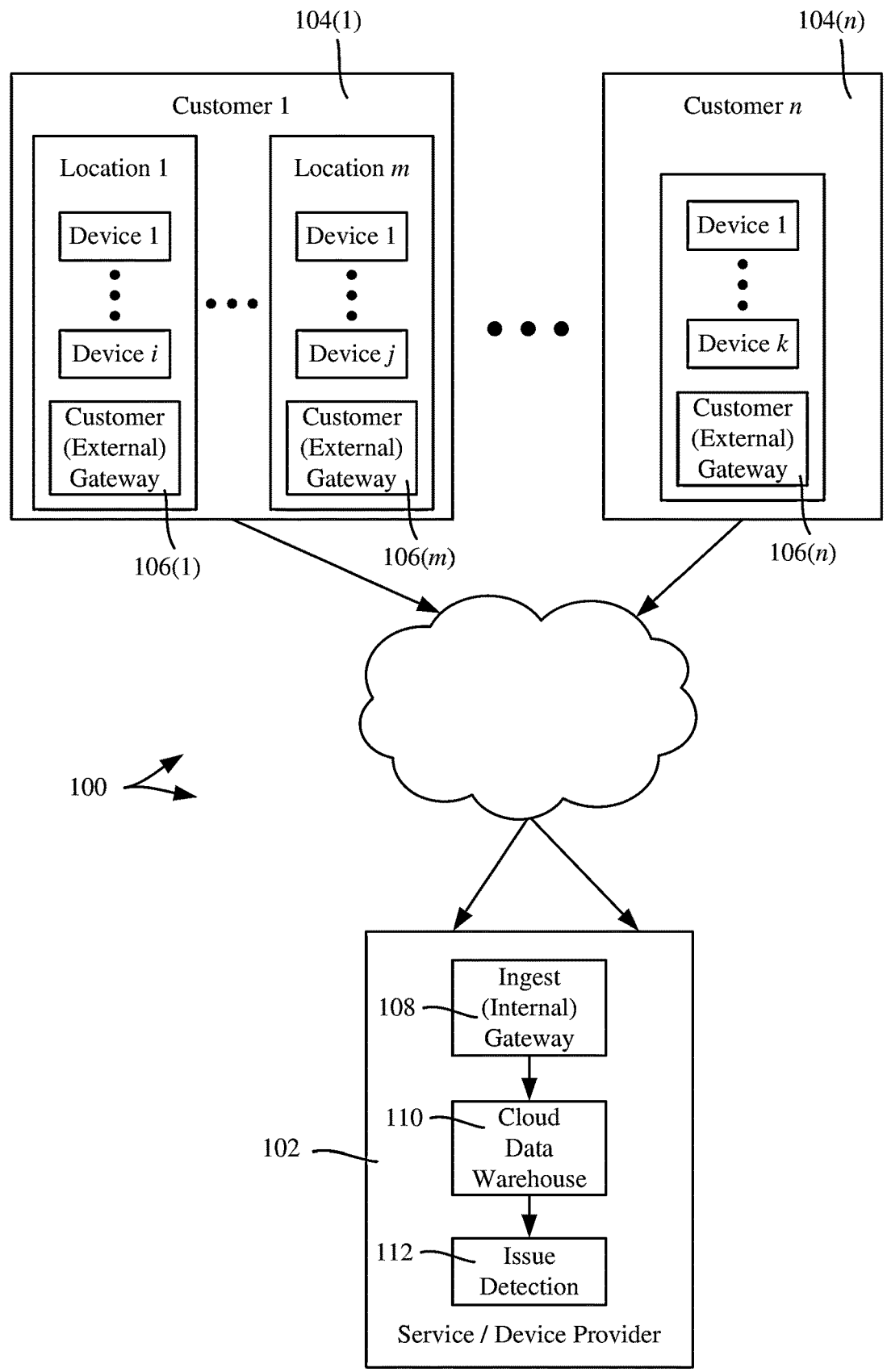
FIG. 1 is a block diagram representation of example components and data-related operations for providing device telemetry data to be processed for issue detection, in accordance with various aspects and implementations of the subject disclosure.

FIG. 1 shows an overall data handling system 100 in which a service/device provider 1 102 receives telemetry data from customers 104(1)-104(*n*) via devices such as servers, switches, storage systems and the like. As will be understood, customers can have multiple locations, e.g., location 1-location m for the customer 104(1), or can have a single location, e.g., customer 104(*n*). In the example of FIG. 1, the customer 104(1) has multiple devices depicted as device 1-device i at location 1, and devices device 1-device j at location m. The customer 104(*n*) has multiple devices depicted as device 1-device i at location 1, and devices device 1-device j at its sole location. These devices can be the source of a problem as described herein.

Each customer/customer location also has an external customer gateway which can be the source of a problem. In the example of FIG. 1, the customer 104(1) has an external customer gateway 106(1) at location 1, and an external customer gateway 106(*m*) at location m, while the customer 104(*n*) has an external customer gateway 106(*n*).

As also shown in FIG. 1, the service/device provider 102 has an internal (ingest) gateway 108. This gateway provides the customers' telemetry data, which can be stored in a cloud data warehouse 110. Once the customers' telemetry data is accessible, issue detection logic 112 as described herein processes the data to determine potential issues, and if detected, narrow down the possible source(s) of those issues.

Figure 2:
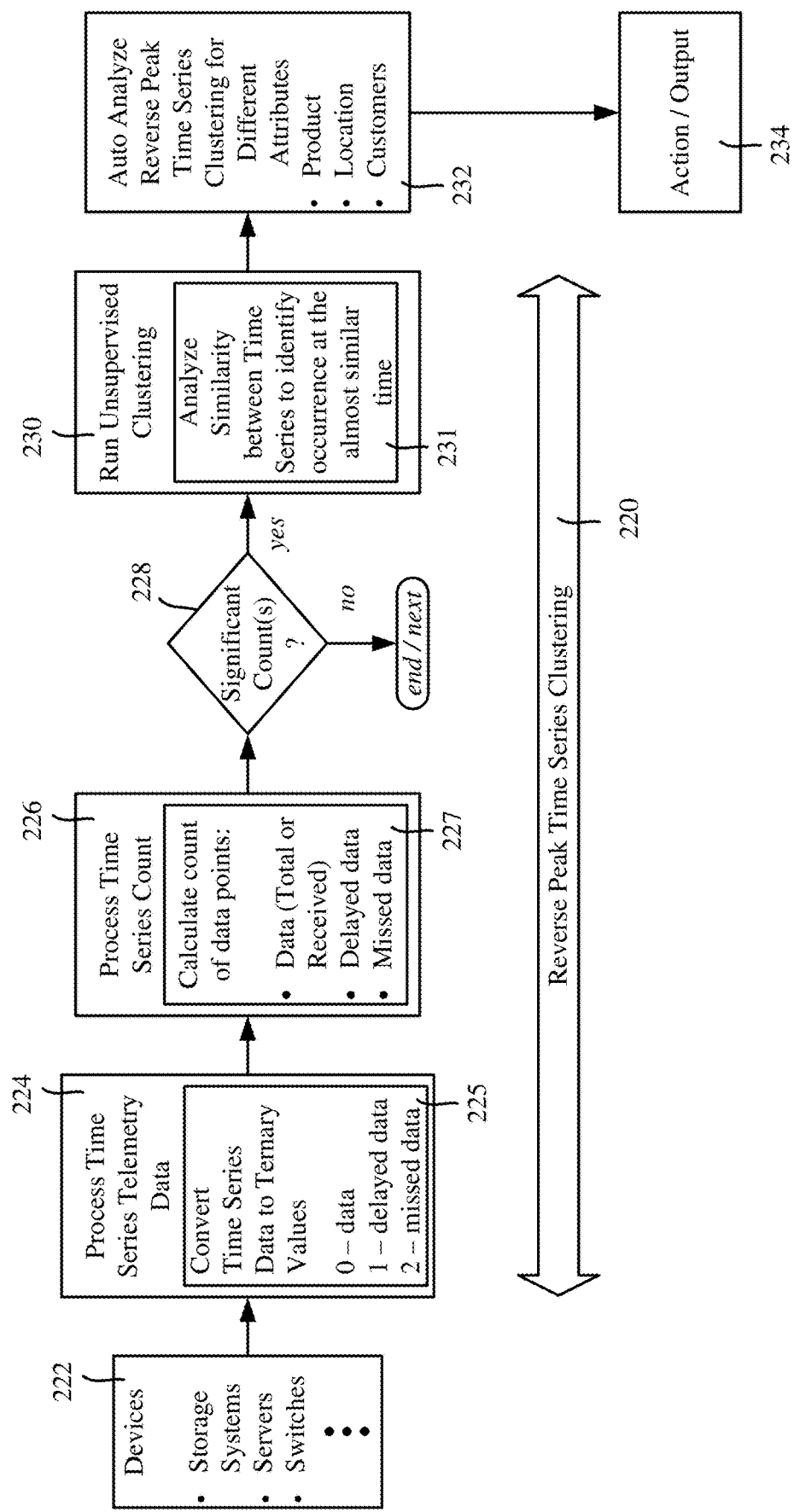
FIG. 2 is an example block diagram representation of reverse peak time series clustering used for issue detection, in accordance with various aspects and implementations of the subject disclosure.

FIG. 2 shows an implementation in which the issue detection logic 112 (of FIG. 1) is performed via reverse peak time series clustering 220. As shown in FIG. 2, the various devices 222 provide telemetry data that is converted (block 224) as described herein into ternary values (block 225). For example, received data can be converted to a zero (0), delayed data can be converted to a one (1), and missing data (detected by a gap in the time series data) can be converted to a two (2). Note that delayed data has a timestamp of when it was generated, and thus can be distinguished from missing data that was never received. A threshold delay criterion (e.g., X seconds or minutes) can be evaluated against the amount of delay (e.g., generated timestamp versus received timestamp) to determine whether received data is delayed or regular data.

As represented in FIG. 2 via block 226, the ternary data representation is counted to obtain count data 227, including a delayed data count value for the delayed data and a missed data count value for the missing data. The received data can be used as part of a base value (divisor) as described herein, such as used in a total of all data, that is, received data plus delayed data plus missing data. Alternatively, a total counter can be incremented for each piece of received data, delayed data and missing data as it is encountered.

In this way, if there is a significant amount of delayed data and/or missing data, as represented by the evaluation operation(s) 228 in FIG. 2, further action is taken. For example, if the delayed data count as a percentage of the total data satisfies a significance threshold value (e.g., greater than X (e.g., five) percent, then unsupervised clustering is performed to determine the likely source of the problem. Similarly, if the missing data count as a percentage of the total data satisfies a significance threshold value (e.g., greater than Y (e.g., also five) percent, then unsupervised clustering is performed to determine the likely source of the problem. Note that the significance threshold values can be the same or different for missing data counts and delayed data counts. In an alternative, the delayed data count and the missing data count can be summed to determine if their combined percentage is too high as a percentage of the total data. Further note that it is also feasible to use ratios instead of or in addition to percentages, and these can be relative to the received data count. For example, if the delayed data count to the received data count is too high (relative to some defined threshold), then perform unsupervised clustering on the data, and/or if the missing data count to the received data count is too high (relative to some defined threshold), then perform unsupervised clustering on the ternary data as described herein. Again, a sum of the delayed data count and the missing data count can be used to determine their combined ratio to the received data count.

Figure 3:
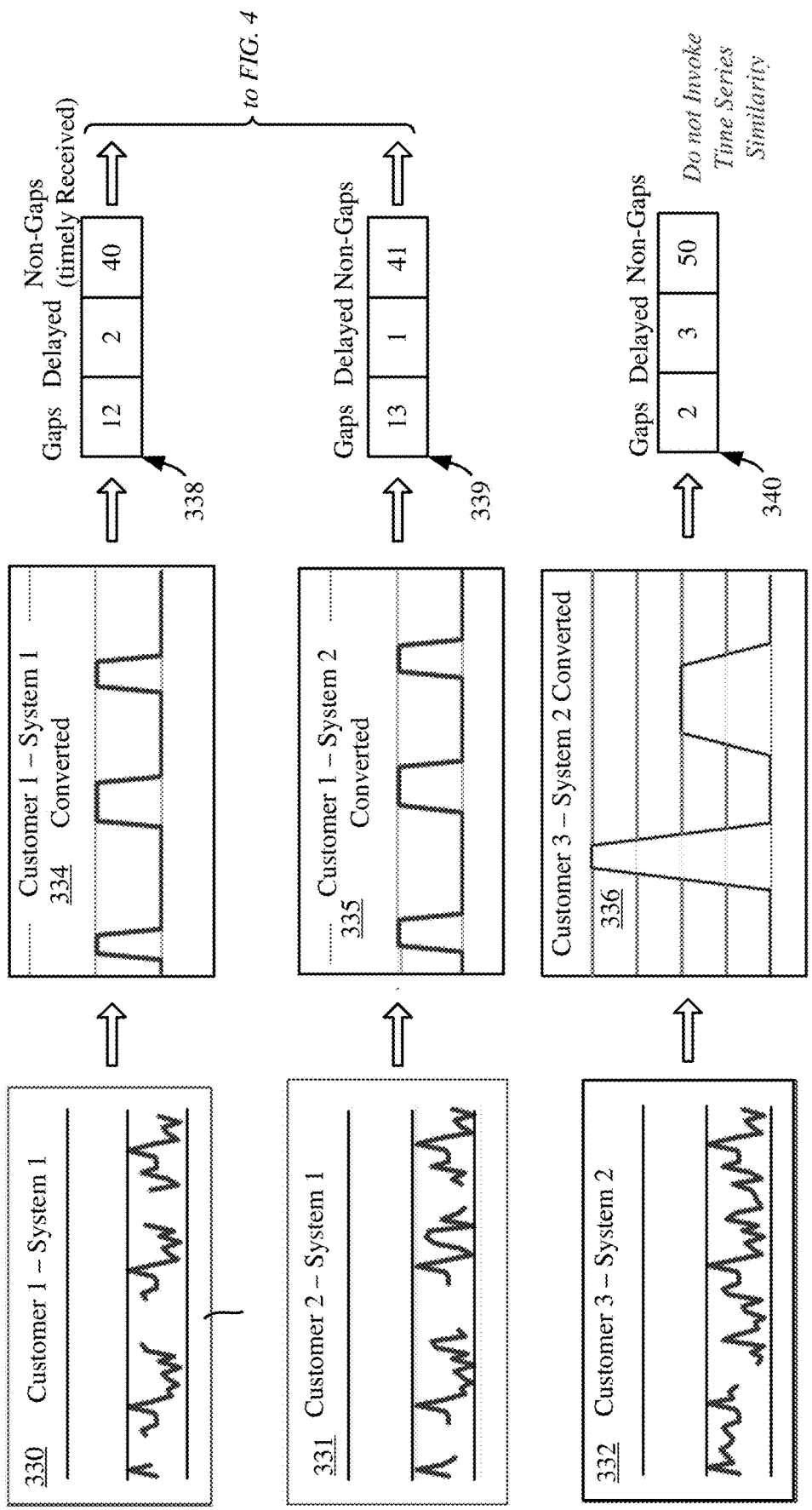
FIGS. 3 and 4 comprise an example representation of processing time series datasets to find similarity data based on received, delayed or missing time series data, in accordance with various aspects and implementations of the subject disclosure.
Figure 4:
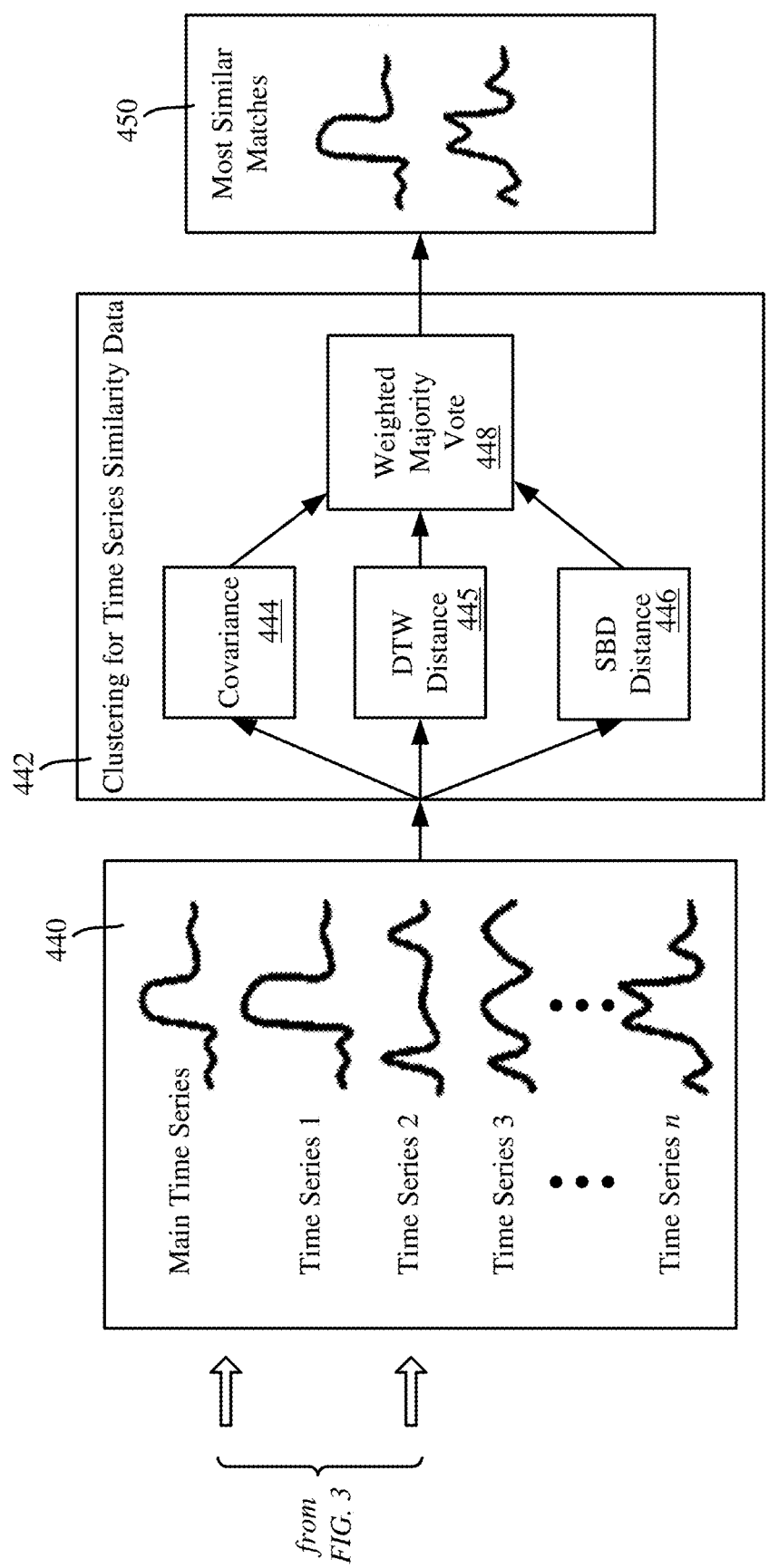

Turning to an example, FIGS. 3 and 4 show how incoming telemetry data 330-332 are converted into ternary values representing timely received data (non-gaps), delayed data and missing data (non-gaps). Graphically, the converted data is represented via blocks 334-336. Example counts of the counted gaps, counted delayed data and counted received data are shown in data structures 338-340.

The time series datasets can be considered candidate datasets, with a candidate dataset selected for further processing if the significance criterion or criteria is satisfied. In this example, consider that the counts data structures 338 and 339 via their counts reach a significance threshold value(s), while the counts data structure's (block 340) counts do not. Accordingly, the converted time series 335 and 336 are selected to be processed via unsupervised clustering as represented in FIG. 4.

In general, unsupervised clustering as described herein operates to find similar patterns occurring at similar times in the main time series data versus filtered data comprising a subset of the main time series data that is deemed to have significant amounts of missing and/or delayed data. For example, filtering by customer products, customer offers and customer locations can be performed as described herein, which results in different patterns over time. Then, for example, if the products time series (similarly converted) dataset is most similar to the main time series data, it is known that the products may be causing the problem. If one location's time series (similarly converted) datasets are most similar, then that location is likely problematic, either the location's devices or the location's external gateway. In general, the more that a filtered and converted dataset's received, delayed and/or missing data generally aligns with that of the converted main dataset, the more similar.

Thus, the components of FIG. 4 obtain the various time series datasets 440 including time series datasets obtained via filtering and conversion to ternary data. Via clustering as represented by block 442 with corresponding distance measurements (e.g., covariance 444, dynamic time warping (DTW) distance 445 and shape-based distance (SBD 449)), which can be combined via a weighted majority vote (in which the weights can be learned and tuned), the most similar match(es) 450 are determined.

Figure 5:
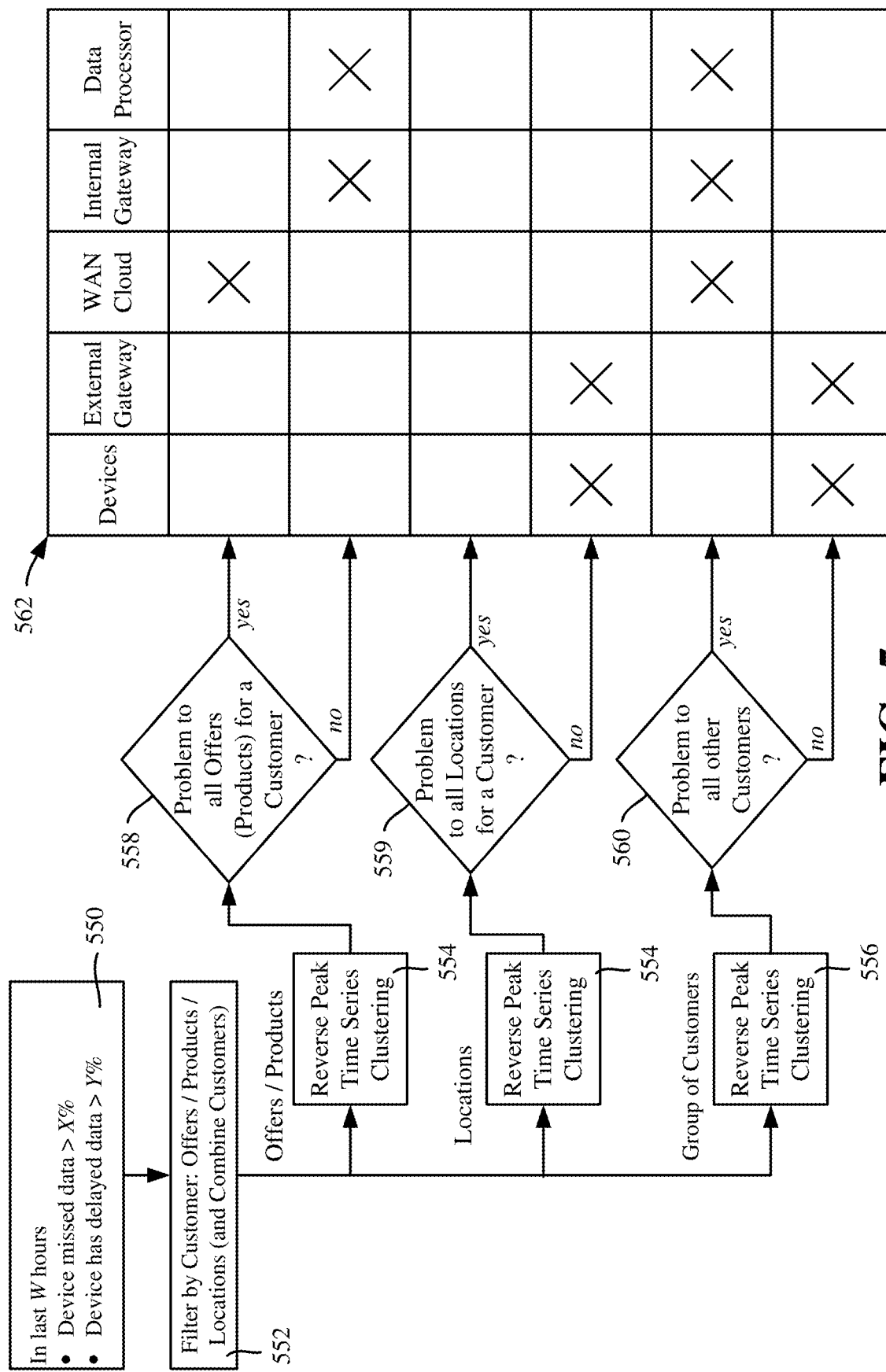
FIG. 5 is an example representation of how reverse peak time series clustering can be mapped to potential problems, in accordance with various aspects and implementations of the subject disclosure.
Figure 6:
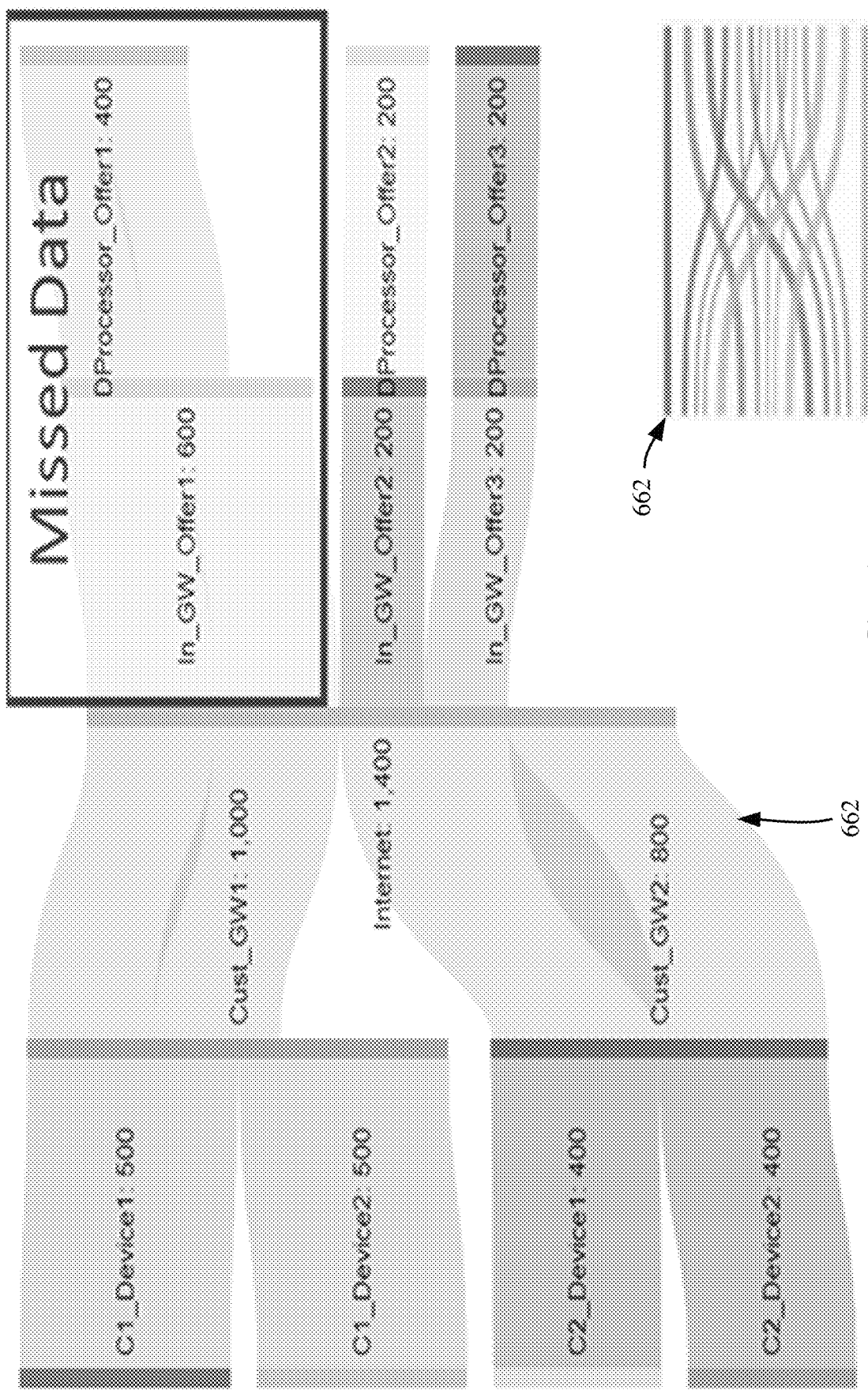
FIG. 6 is an example representation of visualizations based on processing time series data, in accordance with various aspects and implementations of the subject disclosure.

FIG. 5 summarizes the count evaluation and filtering. For example, as represented via block 550, in the last W (e.g., four) hours, if the missed data of the devices is greater than X percent (e.g., X=5), and/or the delayed data of the devices is greater than Y percent (e.g., Y=5), then the counts indicate the potential problem. Filtering (block 552) by customer and a customer's offers/products and locations, as well as combining data of a selected group of (which can be all) customers can provide a number of datasets per customer and a combined group dataset. These datasets can be used with unsupervised clustering (blocks 554-556) to find the most similar (converted) time series, which indicates problem(s).

Once the similarity data is obtained, the similarity data can be evaluated, as represented via example operations 558-560. For example, if the data indicate a problem with all offers/products of a customer, then as shown in the table 562, it is most likely to be a WAN cloud-based problem, otherwise the problem can be an internal gateway or data processing problem of the service/device provider 102 (FIG. 1). If the data indicate a problem with some (but not all) locations of a customer, then it is most likely to be a device or external gateway problem of the customer. If the problem is to all customers of the selected group, which can be all customers, customers within a certain region and so on, then the problem is likely a WAN cloud-based problem, or an internal (ingest) gateway problem or data processing problem of the service/device provider 102 (FIG. 1). If not to all customers, then the problem is more likely a device or external gateway problem of the customer.

To assist a support engineer or the like in analyzing the data, visualizations (e.g., 660 and 662) of can be generated and output. Example visualizations can include reverse and filtered Sankey charts. There can be different charts for customer devices, the customer gateway, the WAN, the provider's ingest gateway and the provider's data processing.

Figure 7:
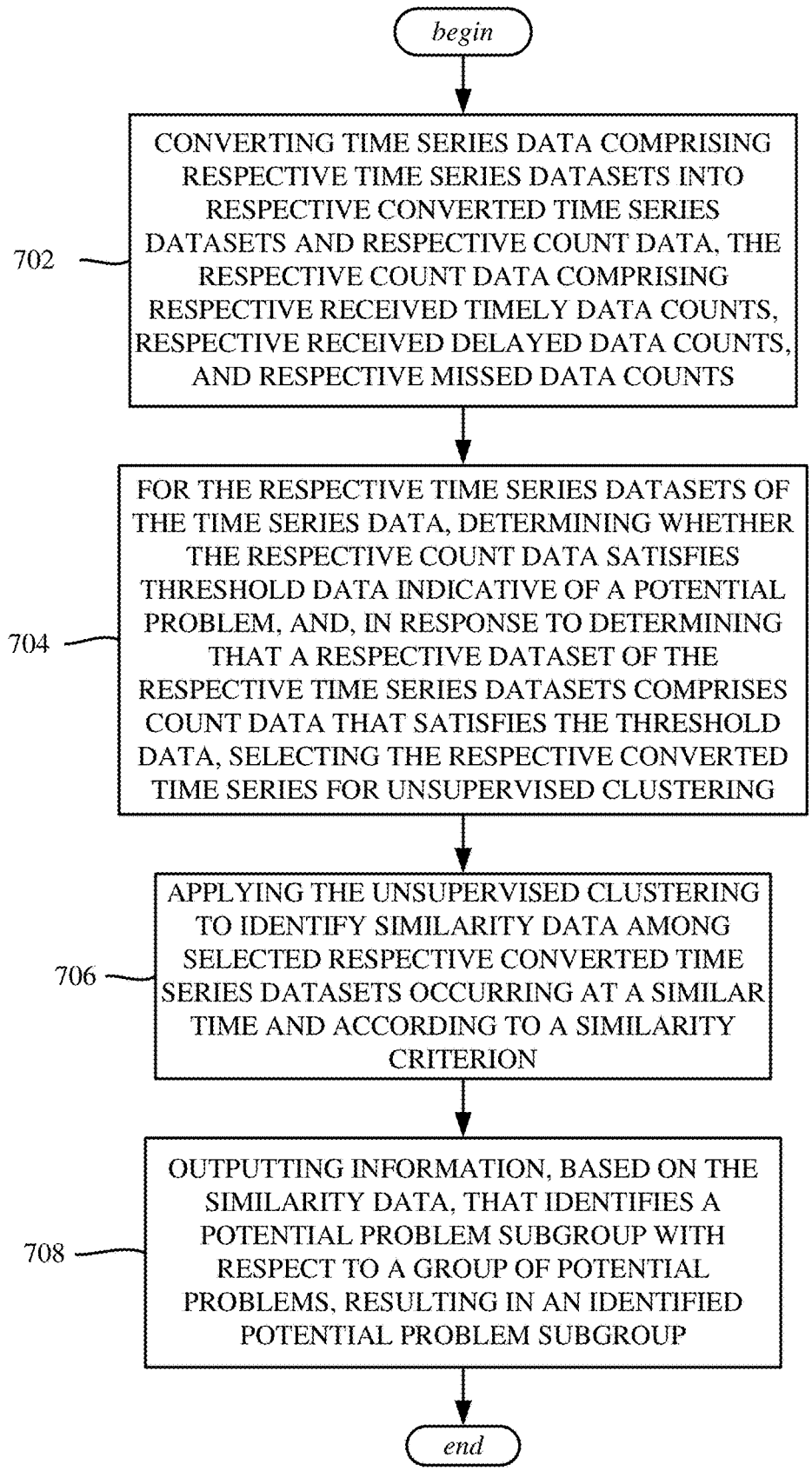
FIG. 7 is a flow diagram showing example operations related to processing time series datasets to identify a potential problem, in accordance with various aspects and implementations of the subject disclosure.

One or more aspects can be embodied in a system, such as represented in FIG. 7, and for example can comprise a memory that stores computer executable components and/or operations, and a processor that executes computer executable components and/or operations stored in the memory. Example operations can comprise operation 702, which represents converting time series data comprising respective time series datasets into respective converted time series datasets and respective count data, the respective count data comprising respective received timely data counts, respective received delayed data counts, and respective missed data counts. Operation 704 represents, for the respective time series datasets of the time series data, determining whether the respective count data satisfies threshold data indicative of a potential problem, and, in response to determining that a respective dataset of the respective time series datasets comprises count data that satisfies the threshold data, selecting the respective converted time series for unsupervised clustering. Operation 706 represents applying the unsupervised clustering to identify similarity data among selected respective converted time series datasets occurring at a similar time and according to a similarity criterion. Operation 708 represents outputting information, based on the similarity data, that identifies a potential problem subgroup with respect to a group of potential problems, resulting in an identified potential problem subgroup.

The time series data can include device telemetry data

For the respective time series datasets, the threshold data can include a first value corresponding to a threshold percentage of at least one of the respective received delayed data counts relative to at least one of the respective data point counts of the respective time series datasets, and a second value corresponding to a percentage of at least one of the respective missed data relative to at least one of the respective data point counts of the respective time series datasets.

The group of potential problems from which the identified potential problem subgroup is identified can include a potential external gateway problem, a potential device problem, a potential wide area network problem, a potential data processor problem and a potential internal gateway problem.

Further operations can include filtering the time series data by products associated with a customer identity of a customer to obtain the time series datasets, and determining whether the similarity data indicates the potential problem common to the products of the customer. In response to determining that potential problem data of the identified potential problem subgroup is common to the products associated with the customer identity, outputting the information can indicate that the identified potential problem subgroup can include a potential wide area network problem, and, in response to determining that the potential problem data is not common to the products associated with the customer identity, outputting the information can indicate that the identified potential problem subgroup can include at least one of: a potential data processor problem or a potential internal gateway problem.

Further operations can include filtering the time series data by service offers associated with the customer identity to obtain the time series datasets, and determining whether the similarity data indicates the potential problem common to the service offers. In response to determining that potential problem data of the identified potential problem subgroup is common to the service offers, outputting the information can indicate that the identified potential problem subgroup can include a potential wide area network problem, and wherein, in response to determining that the identified potential problem data is not common to service offers, outputting the information can indicate that the identified potential problem subgroup can include at least one of: a potential data processor problem or a potential internal gateway problem.

Further operations can include filtering the time series data by customer locations associated with a customer identity to obtain the time series datasets, and determining whether the similarity data indicates a potential problem common to the customer locations. In response to determining that potential problem data of the identified potential problem subgroup is not common to the customer locations, outputting the information can indicate that the identified potential problem subgroup can include at least one of: a potential external gateway problem or a potential device problem.

The respective count data can satisfy the threshold data indicative of the potential problem among a group of customer identities, and further operations can include determining whether the similarity data indicates the potential problem common to the group of customer identities. In response to determining that potential problem data of the identified potential problem subgroup is common among the group of customer identities, outputting the information can indicate that the potential problem subgroup can include at least one of: a potential data processor problem, a potential internal gateway problem or a potential wide area network problem, and, in response to determining that the potential problem data is not common among the group of customers, outputting the information can indicate that the potential problem subgroup can include at least one of: a potential external gateway problem or a potential device problem.

Figure 8:
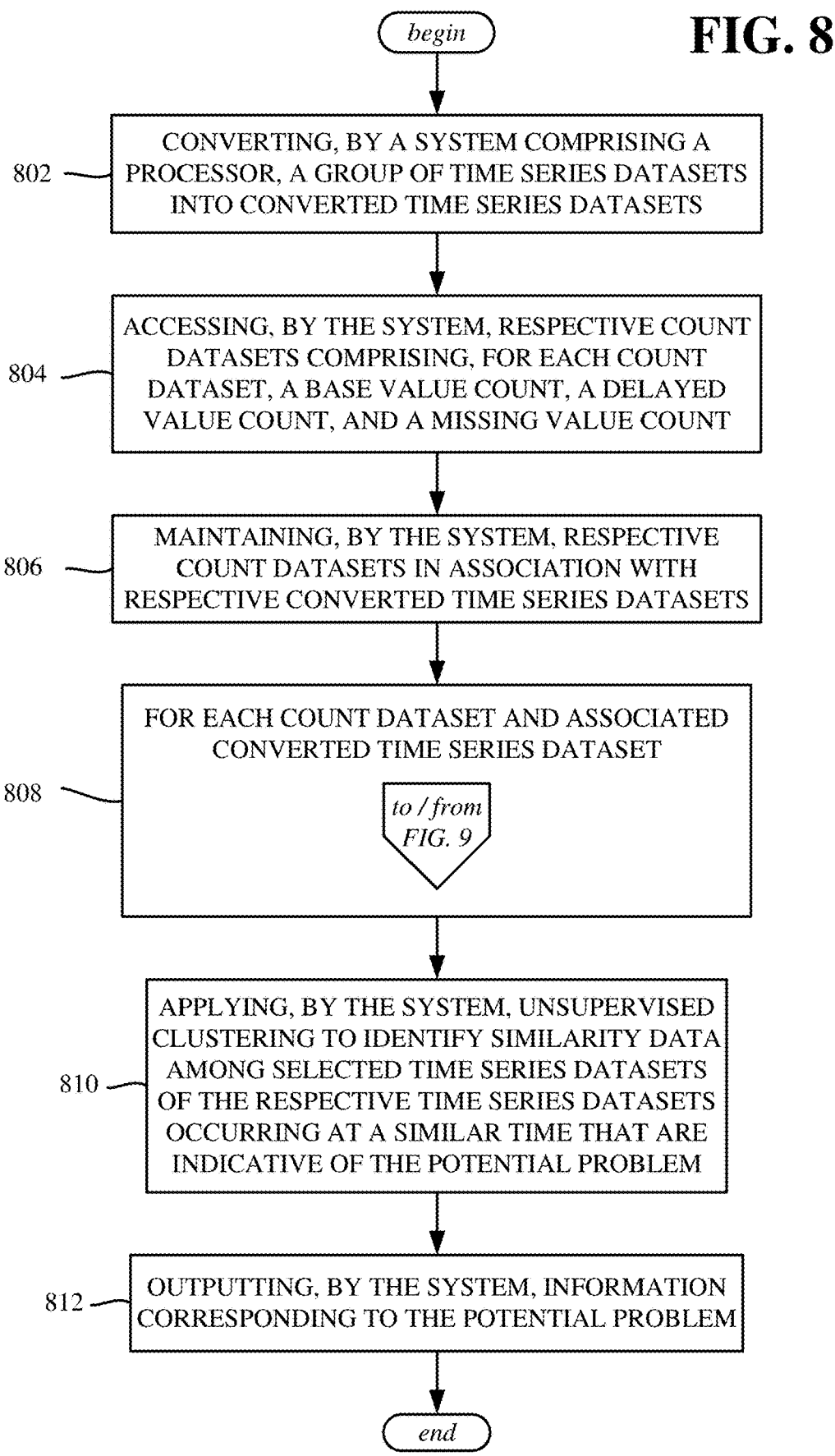
FIGS. 8 and 9 comprise a flow diagram showing example operations related to applying unsupervised clustering to identify similarity data among selected time series datasets of occurring at a similar time that are indicative of a potential problem, in accordance with various aspects and implementations of the subject disclosure.
Figure 9:
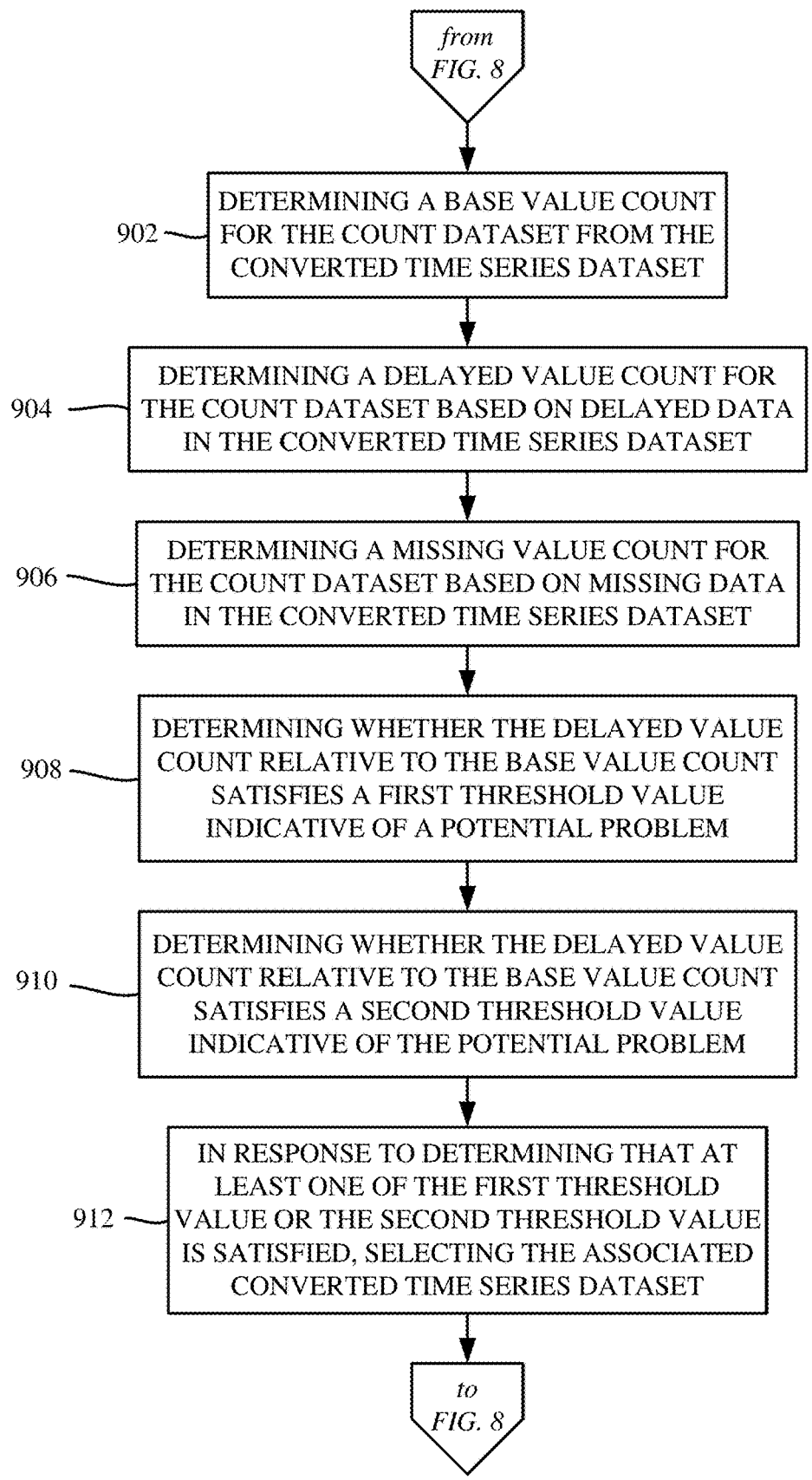

One or more example aspects, such as corresponding to example operations of a method, are represented in FIGS. 8 and 9. Operation 802 represents converting, by a system comprising a processor, a group of time series datasets into converted time series datasets. Operation 804 represents accessing, by the system, respective count datasets comprising, for each count dataset, a base value count, a delayed value count, and a missing value count. Operation 806 represents maintaining, by the system, respective count datasets in association with respective converted time series datasets. Operation 808 represents, for each count dataset and associated converted time series dataset; the example operations continue at FIG. 9.

Operation 902 represents determining a base value count for the count dataset from the converted time series dataset. Operation 904 represents determining a delayed value count for the count dataset based on delayed data in the converted time series dataset. Operation 904 represents determining a missing value count for the count dataset based on missing data in the converted time series dataset. Operation 908 represents determining whether the delayed value count relative to the base value count satisfies a first threshold value indicative of a potential problem. Operation 910 represents determining whether the delayed value count relative to the base value count satisfies a second threshold value indicative of the potential problem. Operation 912 represents, in response to determining that at least one of the first threshold value or the second threshold value is satisfied, selecting the associated converted time series dataset. The example operations return to operation 810 of FIG. 8.

Operation 810 represents applying, by the system, unsupervised clustering to identify similarity data among selected time series datasets of the respective time series datasets occurring at a similar time that are indicative of the potential problem. Operation 812 represents outputting, by the system, information corresponding to the potential problem.

For each count dataset, the base value can include a count of received data points, the first threshold value can be a defined threshold percentage, and determining whether the delayed value count relative to the base value count satisfies a first threshold value can include summing the base value count with the delayed value count and with the missing value count to obtain a total data point count, determining a missing data point percentage from the delayed value count divided by the total data point count, and evaluating the missing data point percentage satisfies the defined threshold percentage.

Operations can include filtering, by the system, the group of time series datasets by products represented by product data associated with a customer to determine whether the products of the customer identify the similarity data that are indicative of the potential problem.

Operations can include filtering, by the system, the group of time series datasets by offers represented by offer data associated with a customer to determine whether the offers of the customer identify the similarity data that are indicative of the potential problem.

Operations can include filtering, by the system, the group of time series datasets by locations represented by location data associated with a customer to determine whether the locations of the customer identify the similarity data that are indicative of the potential problem.

The group of time series datasets can correspond to a group of customers, and applying the unsupervised clustering can identify similarity data, common to the group of customers, that is indicative of the potential problem.

Figure 10:
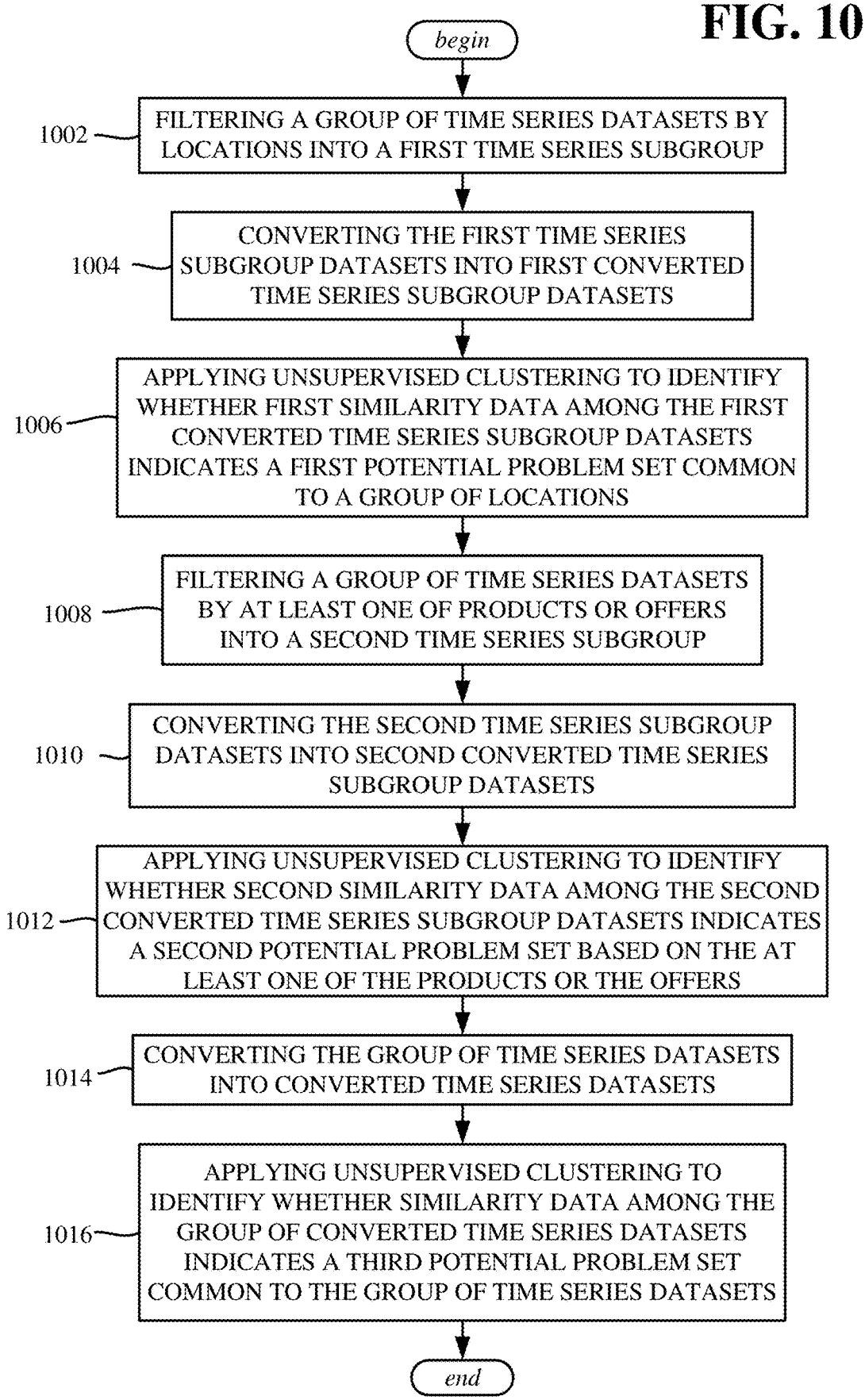
FIG. 10 is a flow diagram showing example operations related to filtering time series datasets for applying unsupervised clustering thereto to determine potential problems, in accordance with various aspects and implementations of the subject disclosure.

FIG. 10 summarizes various example operations, e.g., corresponding to a machine-readable medium, comprising executable instructions that, when executed by a processor, facilitate performance of operations. Operation 1002 represents filtering a group of time series datasets by locations into a first time series subgroup. Operation 1004 represents converting the first time series subgroup datasets into first converted time series subgroup datasets. Operation 1006 represents applying unsupervised clustering to identify whether first similarity data among the first converted time series subgroup datasets indicates a first potential problem set common to a group of locations. Operation 1008 represents filtering a group of time series datasets by at least one of products or offers into a second time series subgroup. Operation 1010 represents converting the second time series subgroup datasets into second converted time series subgroup datasets. Operation 1012 represents applying unsupervised clustering to identify whether second similarity data among the second converted time series subgroup datasets indicates a second potential problem set based on the at least one of the products or the offers. Operation 1014 represents converting the group of time series datasets into converted time series datasets. Operation 1016 represents applying unsupervised clustering to identify whether similarity data among the group of converted time series datasets indicates a third potential problem set common to the group of time series datasets.

Further operations can include obtaining the group of time series datasets from a larger candidate group of time series datasets larger than the group of time series datasets; obtaining can include, for each candidate dataset of the larger candidate group of time series datasets, excluding the candidate dataset from the group of time series datasets in response to a defined problem significance criterion not being satisfied as determined based on a count of missing data points and a count of delayed data points in the candidate dataset, or including the candidate dataset in the group of time series datasets in response to the defined problem significance criterion being satisfied as determined based on the count of missing data points and the count of delayed data points in the candidate dataset.

As can be seen, the technology described herein uses reverse peak time series clustering on converted (e.g., to ternary values, 0 when data is present, 1 when data is delayed and 2 when data is missing) telemetry time series data. If counts of the missing and/or delayed data are deemed significant, unsupervised time series clustering is applied to filtered (by products, locations and customers) ternary converted datasets to identify potential problems. By leveraging ternary time series data, the technology is highly scalable to large datasets. This allows troubleshooting across products, locations and customers for large amounts of data. Reverse and filtered Sankey charts can be output for visualization.

Figure 11:
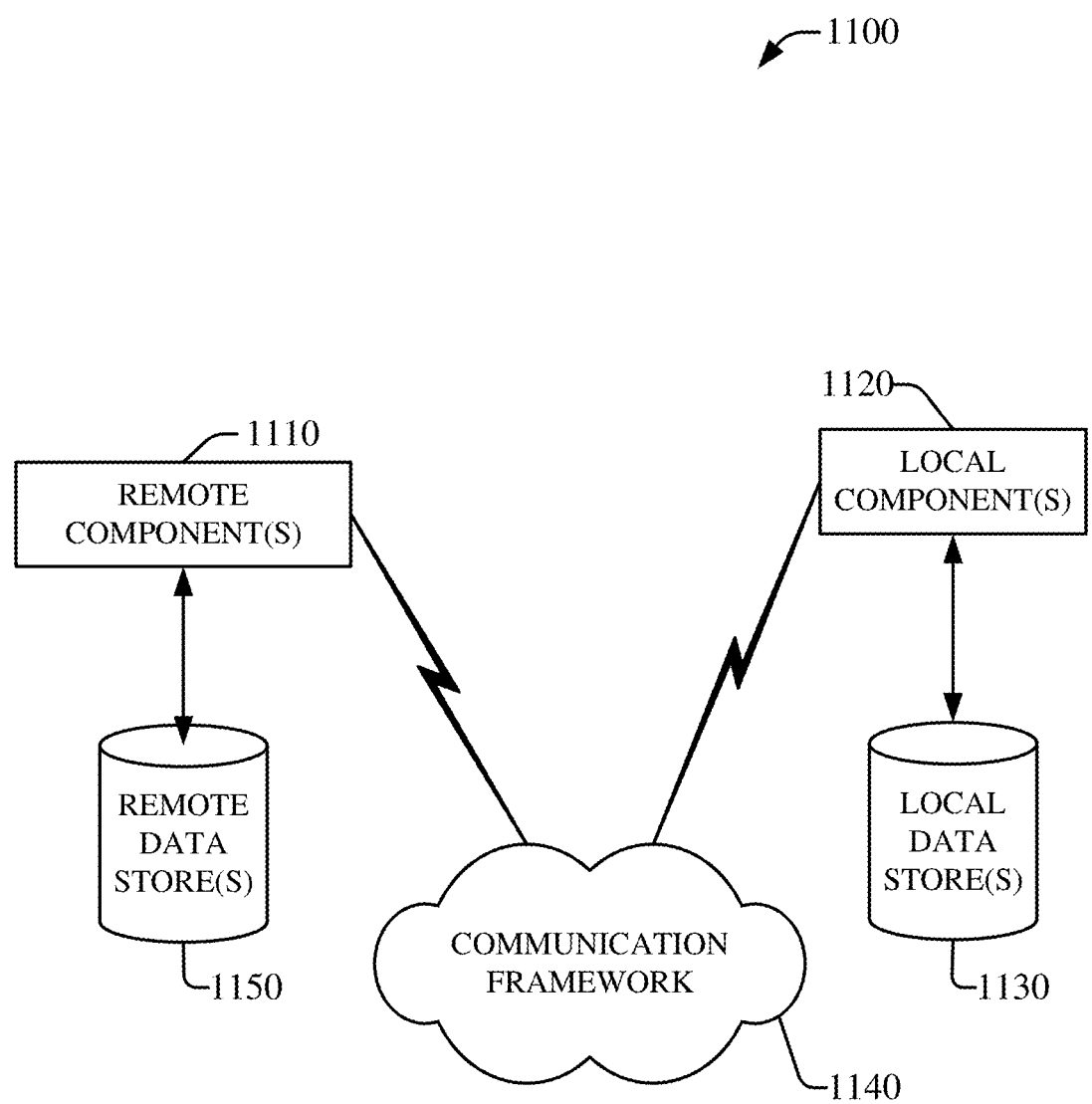
FIG. 11 is a block diagram representing an example computing environment into which aspects of the subject matter described herein may be incorporated.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
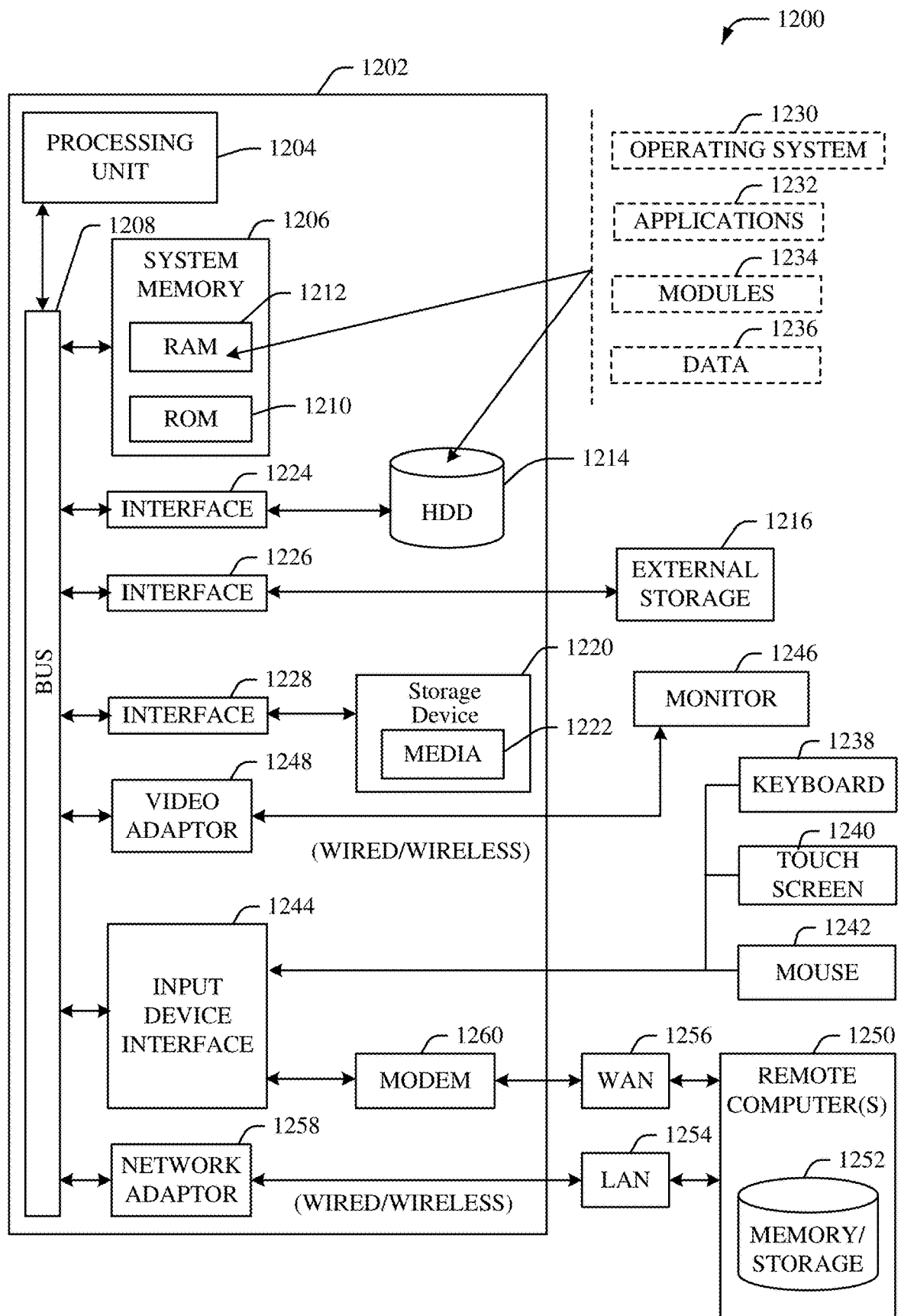
FIG. 12 depicts an example schematic block diagram of a computing environment with which the disclosed subject matter can interact/be implemented at least in part, in accordance with various aspects and implementations of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), and can include one or more external storage devices 1216 (e.g., a magnetic floppy disk drive (FDD) 1216, a memory stick or flash drive reader, a memory card reader, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214.

Other internal or external storage can include at least one other storage device 1220 with storage media 1222 (e.g., a solid state storage device, a nonvolatile memory device, and/or an optical disk drive that can read or write from removable media such as a CD-ROM disc, a DVD, a BD, etc.). The external storage 1216 can be facilitated by a network virtual machine. The HDD 1214, external storage device(s) 1216 and storage device (e.g., drive) 1220 can be connected to the system bus 1208 by an HDD interface 1224, an external storage interface 1226 and a drive interface 1228, respectively.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
processing time series data received from one or more devices using an issue detection logic associated with a device provider, the processing comprising:
converting the time series data comprising respective time series datasets into respective converted time series datasets and respective count data, the respective count data comprising respective received timely data counts, respective received delayed data counts, and respective missed data counts;
for the respective time series datasets of the time series data, determining whether the respective count data satisfies threshold data indicative of a potential problem, and, in response to determining that a respective dataset of the respective time series datasets comprises count data that satisfies the threshold data, selecting the respective converted time series for unsupervised clustering;
applying the unsupervised clustering to identify similarity data among selected respective converted time series datasets occurring at a similar time and according to a similarity criterion; and
outputting information, based on the similarity data, that identifies a potential problem subgroup with respect to a group of potential problems, resulting in an identified potential problem subgroup.

2. The system of claim 1, wherein the time series data comprises device telemetry data.

3. The system of claim 1, wherein, for the respective time series datasets, the threshold data comprises a first value corresponding to a threshold percentage of at least one of the respective received delayed data counts relative to at least one of the respective data point counts of the respective time series datasets, and a second value corresponding to a percentage of at least one of the respective missed data relative to at least one of the respective data point counts of the respective time series datasets.

4. The system of claim 1, wherein the group of potential problems from which the identified potential problem subgroup is identified comprises at least one of a potential external gateway problem, a potential device problem, a potential wide area network problem, a potential data processor problem or a potential internal gateway problem.

5. The system of claim 1, wherein the operations further comprise filtering the time series data by products associated with a customer identity of a customer to obtain the time series datasets, and determining whether the similarity data indicates a potential problem common to the products of the customer.

6. The system of claim 5, wherein, in response to determining that potential problem data of the identified potential problem subgroup is common to the products associated with the customer identity, the outputting the information indicates that the identified potential problem subgroup comprises a potential wide area network problem, and wherein, in response to determining that the potential problem data is not common to the products associated with the customer identity, the outputting the information indicates that the identified potential problem subgroup comprises at least one of: a potential data processor problem or a potential internal gateway problem.

7. The system of claim 1, wherein the operations further comprise filtering the time series data by service offers associated with a customer identity to obtain the time series datasets, and determining whether the similarity data indicates a potential problem common to the service offers.

8. The system of claim 7, wherein, in response to determining that potential problem data of the identified potential problem subgroup is common to the service offers, the outputting the information indicates that the identified potential problem subgroup comprises a potential wide area network problem, and wherein, in response to determining that the identified potential problem subgroup is not common to the service offers, the outputting the information indicates that the identified potential problem subgroup comprises at least one of: a potential data processor problem or a potential internal gateway problem.

9. The system of claim 1, wherein the operations further comprise filtering the time series data by customer locations associated with a customer identity to obtain the time series datasets, and determining whether the similarity data indicates a potential problem common to the customer locations.

10. The system of claim 9, wherein, in response to determining that potential problem data of the identified potential problem subgroup is not common to the customer locations, the outputting the information indicates that the identified potential problem subgroup comprises at least one of: a potential external gateway problem or a potential device problem.

11. The system of claim 1, wherein the respective count data satisfies the threshold data indicative of the potential problem among a group of customer identities, and wherein the operations further comprise determining whether the similarity data indicates a potential problem common to the group of customer identities.

12. The system of claim 11, wherein, in response to determining that potential problem data of the identified potential problem subgroup is common among the group of customer identities, the outputting the information indicates that the potential problem subgroup comprises at least one of: a potential data processor problem, a potential internal gateway problem or a potential wide area network problem, and wherein, in response to determining that the potential problem data is not common among a group of customers, the outputting the information indicates that the potential problem subgroup comprises at least one of: a potential external gateway problem or a potential device problem.

13. A method, comprising:
processing, by a system comprising a processor, time series data received from one or more devices, using an issue detection logic of a device provider;
converting, by the system, a group of time series datasets of the time series data into converted time series datasets;
accessing, by the system, respective count datasets comprising, for each count dataset, a base value count, a delayed value count, and a missing value count;
maintaining, by the system, the respective count datasets in association with respective converted time series datasets;
for each count dataset and associated converted time series dataset:
determining the base value count for a count dataset from the converted time series dataset,
determining the delayed value count for the count dataset based on delayed data in the converted time series dataset,
determining the missing value count for the count dataset based on missing data in the converted time series dataset,
determining whether the delayed value count relative to the base value count satisfies a first threshold value indicative of a potential problem,
determining whether the delayed value count relative to the base value count satisfies a second threshold value indicative of the potential problem, and
in response to determining that at least one of the first threshold value or the second threshold value is satisfied, selecting the associated converted time series dataset;
applying, by the system, unsupervised clustering to identify similarity data among selected time series datasets of the respective time series datasets occurring at a similar time that are indicative of the potential problem; and
outputting, by the system, information corresponding to the potential problem.

14. The method of claim 13, wherein, for each count dataset, a base value comprises a count of received data points, wherein the first threshold value is a defined threshold percentage, and wherein the determining whether the delayed value count relative to the base value count satisfies the first threshold value comprises summing the base value count with the delayed value count and with the missing value count to obtain a total data point count, determining a missing data point percentage from the delayed value count divided by the total data point count, and evaluating the missing data point percentage satisfies the defined threshold percentage.

15. The method of claim 13, further comprising filtering, by the system, the group of time series datasets by products represented by product data associated with a customer to determine whether the products of the customer identify the similarity data that are indicative of the potential problem.

16. The method of claim 13, further comprising filtering, by the system, the group of time series datasets by offers represented by offer data associated with a customer to determine whether the offers of the customer identify the similarity data that are indicative of the potential problem.

17. The method of claim 13, further comprising filtering, by the system, the group of time series datasets by locations represented by location data associated with a customer to determine whether the locations of the customer identify the similarity data that are indicative of the potential problem.

18. The method of claim 13, wherein the group of time series datasets corresponds to a group of customers, and wherein the applying the unsupervised clustering identifies similarity data, common to the group of customers, that is indicative of the potential problem.

19. A non-transitory machine-readable medium, comprising executable instructions that, when executed by a processor, facilitate performance of operations, the operations comprising:
- processing time series data received from one or more devices using an issue detection logic specified based on received input corresponding to a device provider;
- filtering a group of time series datasets by locations into a first time series subgroup;
- converting the first time series subgroup datasets into first converted time series subgroup datasets;
- applying unsupervised clustering to identify whether first similarity data among the first converted time series subgroup datasets indicates a first potential problem set common to a group of locations;
- filtering a group of time series datasets by at least one of products or offers into a second time series subgroup;
- converting second time series subgroup datasets into second converted time series subgroup datasets;
- applying the unsupervised clustering to identify whether second similarity data among the second converted time series subgroup datasets indicates a second potential problem set based on the at least one of the products or the offers;
- converting the group of time series datasets into converted time series datasets; and
- applying the unsupervised clustering to identify whether similarity data among the group of converted time series datasets indicates a third potential problem set common to the group of time series datasets.

20. The non-transitory machine-readable medium of claim 19, wherein the operations further comprise obtaining the group of time series datasets from a larger candidate group of time series datasets larger than the group of time series datasets, the obtaining comprising, for each candidate dataset of the larger candidate group of time series datasets, excluding the candidate dataset from the group of time series datasets in response to a defined problem significance criterion not being satisfied as determined based on a count of missing data points and a count of delayed data points in the candidate dataset, or including the candidate dataset in the group of time series datasets in response to the defined problem significance criterion being satisfied as determined based on the count of missing data points and the count of delayed data points in the candidate dataset.

* * * * *